Aug. 7, 1951        R. H. GODDARD        2,563,022
FUEL FEEDING MECHANISM FOR DETONATING COMBUSTION APPARATUS
Filed Feb. 12, 1944        3 Sheets-Sheet 1
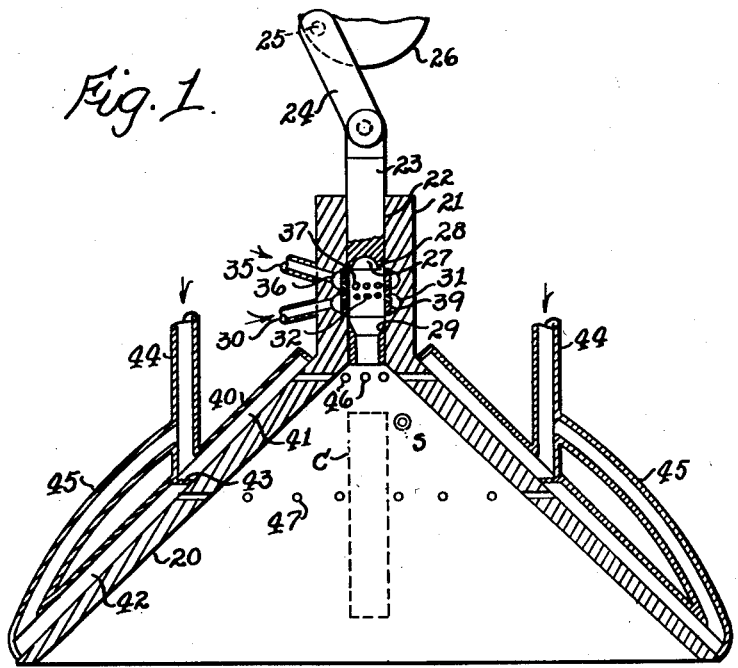
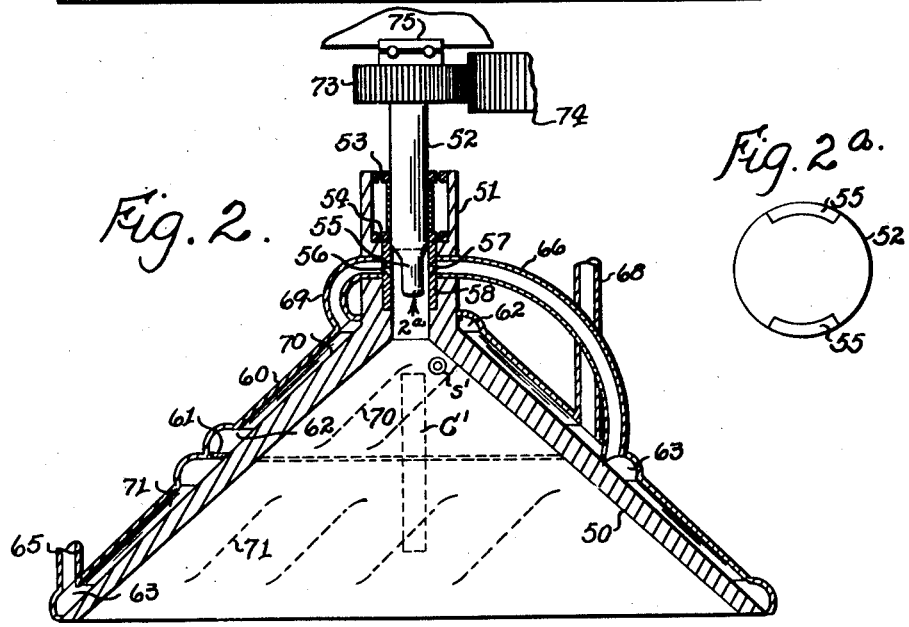
INVENTOR.
Robert H. Goddard.
BY ATTORNEY.

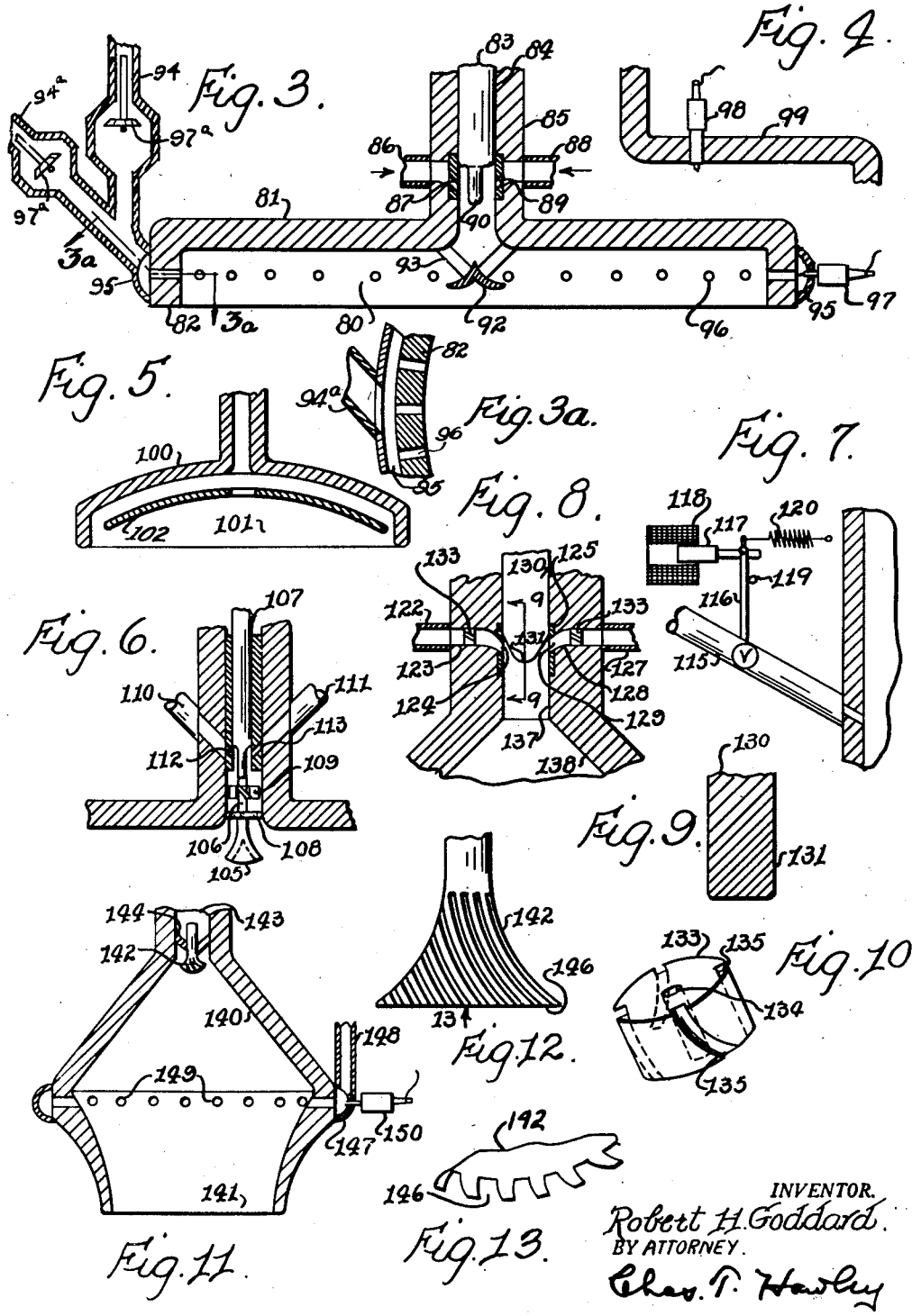

Aug. 7, 1951  R. H. GODDARD  2,563,022
FUEL FEEDING MECHANISM FOR DETONATING COMBUSTION APPARATUS
Filed Feb. 12, 1944  3 Sheets-Sheet 3
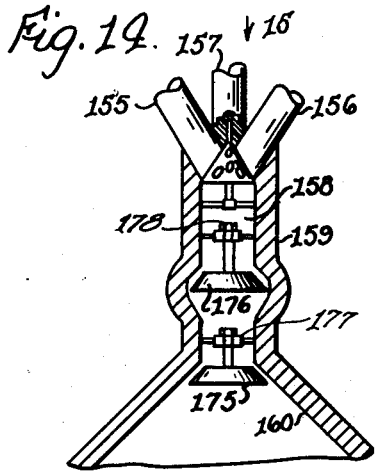
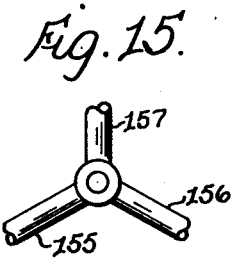
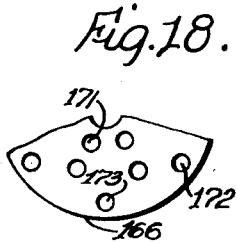
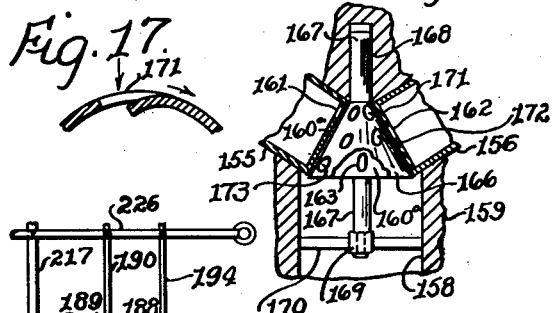
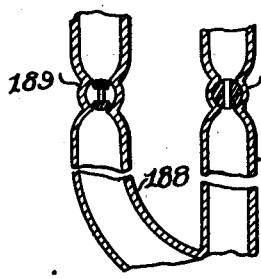
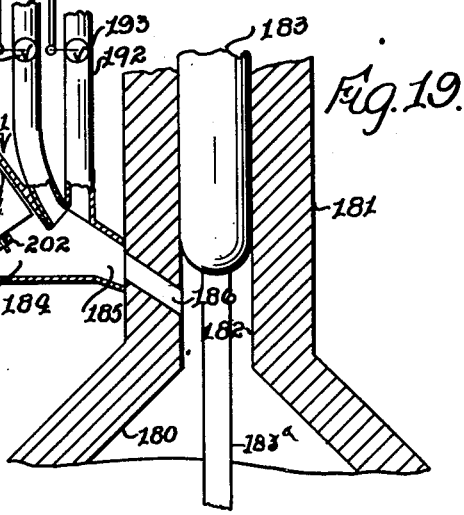
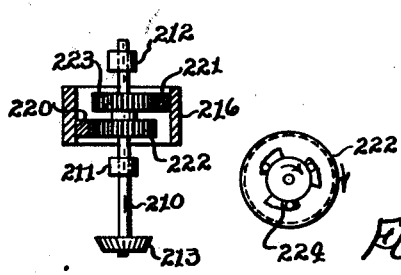
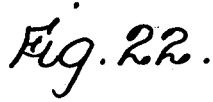
INVENTOR.
Robert H. Goddard.
BY ATTORNEY Patented Aug. 7, 1951

2,563,022

UNITED STATES PATENT OFFICE 2,563,022

FUEL FEEDING MECHANISM FOR DETONATING COMBUSTION APPARATUS

Robert H. Goddard, Annapolis, Md.; Esther C. Goddard, executrix of said Robert H. Goddard, deceased, assignor of one-half to The Daniel and Florence Guggenheim Foundation, New York, N. Y., a corporation of New York Application February 12, 1944, Serial No. 522,101

3 Claims. (Cl. 60—44)

This invention relates to combustion apparatus of the general type in which successive and relatively small charges of a combustible mixture are exploded or detonated in a chamber to produce combustion gases. Such combustion apparatus is used in rocket craft and in other mechanisms where a substantially continuous flow of combustion gases is desired.

One object of the invention is to provide improved means for introducing successive small charges of a combustible mixture into a combustion chamber which is maintained in relatively fixed position.

A further object is to provide effective cooling devices for such a chamber, which utilize either water or combustion liquids for cooling. I have also provided improved means for feeding the successive charges. In one form of the invention, I provide means for feeding powdered fuel instead of liquid fuel.

My invention further relates to arrangements and combinations of parts which will be hereinafter described and more particularly pointed out in the appended claims.

Preferred forms of the invention are shown in the drawings, in which

Fig. 1 is a sectional front elevation of one form of fixed combustion chamber and intermittent feeding apparatus;

Fig. 2 is a sectional front elevation of a second form of such apparatus;

Fig. 2a is a detail bottom view, looking in the direction of the arrow 2a in Fig. 2;

Fig. 3 is a sectional elevation of a combustion chamber having its end wall in a plane normal to its axis;

Fig. 3a is a fragmentary sectional view, taken along the line 3a—3a in Fig. 3;

Fig. 4 is a partial sectional elevation of a modification of the combustion chamber shown in Fig. 3;

Fig. 5 is a sectional elevation of a further modification;

Fig. 6 is a sectional elevation of a modified feeding mechanism;

Fig. 7 is a sectional elevation of a feed control device;

Fig. 8 is a sectional elevation of an additional type of feeding mechanism;

Fig. 9 is a partial sectional elevation of a valve shaft, taken along the line 9—9 in Fig. 8;

Fig. 10 is a perspective view of a guide member shown in Fig. 8;

Fig. 11 is a sectional elevation of a modified type of combustion chamber;

Fig. 12 is a partial side elevation of a spreading device;

Fig. 13 is a partial bottom view, looking in the direction of the arrow 13 in Fig. 12;

Fig. 14 is a sectional side elevation of a further modification of the combustion chamber feeding mechanism;

Fig. 15 is a detail view, looking in the direction of the arrow 15 in Fig. 14;

Fig. 16 is an enlarged sectional elevation of certain parts shown in Fig. 14;

Fig. 17 is an enlarged fragmentary sectional plan view of the conical rotating valve member shown in Fig. 16;

Fig. 18 is a partial projection of the frustroconical surface of the rotating valve member;

Fig. 19 is a sectional side elevation of a device for intermittently feeding powdered fuel in connection with a liquid oxidizing agent and with an additional non-oxidizing agent;

Fig. 20 is an enlarged sectional side elevation of certain parts shown in Fig. 19;

Fig. 21 is a detail sectional plan view, taken along the line 21—21 in Fig. 19; and Fig. 22 is a side elevation of a pinion and clutch member shown in Figs. 20 and 21.

Referring to Fig. 1, I have shown a conical combustion chamber 20 having a hub or entrance portion 21. The chamber 20 and hub 21 are to be secured in fixed position in a rocket craft or in any other desired mechanism.

The hub 21 has a cylindrical opening 22 to receive a plunger 23 connected by a link 24 to a crankpin 25 on a rotated disc 26. As the disc rotates, the plunger 23 is reciprocated in the opening 22. At its lower end, the plunger 23 is recessed as indicated at 27 and is also tapered at 28 to coact with a conical shoulder 29 in the lower part of the recess 22. The surfaces 28 and 29 engage when the plunger 23 is in its lowest position and thus seal the lower end of the opening 22 at the time of explosion or detonation, as will be hereinafter described.

Liquid fuel, as gasoline, is supplied through a pipe 30 to an annular recess 31 which communicates through perforations 32 with the axial recess 22 when the plunger 23 is raised. A liquid oxidizing agent, such as liquid oxygen, is supplied through a pipe 35 to an annular recess 36 from which it enters the cylindrical recess 22 through perforations 37. The perforations 32 and 37 are preferably formed in a sleeve 39 made of a metal having a low coefficient of expansion and contraction and also a low coefficient of friction, so that close clearance may be maintained with the plunger 23 without danger of binding on rise in temperature.

As the plunger 23 is continually reciprocated, the perforations 32 and 37 are alternately uncovered and covered and slightly separated portions of the mixed combustibles are thus forced into the chamber 20 to assume a position somewhat as indicated at C in Fig. 1, in which position they are ignited by a spark-plug S or in any other convenient manner. The ignition circuit is to be closed when the plunger 23 is at its lowest position, so that the link 24 will be on dead center where it is well adapted to resist upward pressure.

With this construction, each charge C may be relatively small and the explosions will follow each other in rapid succession, the rate being determined by the speed of rotation of the disc 26.

Special provision is made for cooling the chamber 20, which provision comprises a jacket 40 enclosing a jacket space which is divided into upper and lower portions 41 and 42 by a partition 43. Supply pipes 44 communicate directly with the upper jacket space 41 and communicate through branch pipes 45 with the lower jacket space 42.

The conical wall of the combustion chamber 20 is provided with perforations 46 at the upper end of the jacket space 41 and with additional perforations 47 at the upper end of the jacket space 42. Water supplied through the pipes 44 thus effectively cools the outer conical surface of the combustion chamber 20 and is also injected through the perforations 46 and 47 to cool the inner surface of the combustion chamber.

In the construction shown in Fig. 2, a conical combustion chamber 50 is provided with an extension 51 in which a valve shaft 52 rotates in ball bearings 53 and 54. At its lower end, the valve shaft 52 is recessed to provide blades or extensions 55 (Fig. 2a) which alternately open and close ports or perforations 56 and 57 in a lining sleeve or bushing 58.

In this latter construction, I have made provision for utilizing the combustion liquids for cooling purposes. I provide a jacket or casing 60 enclosing a jacket space divided by a partition 61 into an upper portion 62 and a lower portion 63. One of the combustion liquids, as liquid oxygen, is supplied through a pipe 65 to the lower jacket space 63, and the upper part of the jacket space 63 is connected by a pipe 66 to the port 57 previously described.

Liquid fuel, as gasoline, is supplied through a pipe 68 to the lower part of the upper jacket space 62 and the upper end of this jacket space is connected through a pipe 69 to the port 56. Vanes 70 and 71 in the upper and lower jacket spaces 62 and 63 insure uniform distribution of the cooling liquids over the conical outer surface portions of the combustion chamber 50.

The valve shaft 52 may be rotated at any desired speed by any suitable driving connection, such as a pinion 73 driven by a gear 74. A thrust bearing 75 takes the upward pressure at the time of explosion or detonation, at which time the ports 56 and 57 will be closed by the blades or extensions 55. The position of the charge is indicated at C' and a spark-plug is indicated at S'.

In the modified construction shown in Fig. 3, I have shown a combustion chamber 80 having a flat upper end portion 81 and an annular depending flange 82. A plunger 83 is rotated in an opening 84 in a hub or upward extension 85. Liquid fuel is supplied through a pipe 86 and port 87, and liquid oxygen through a pipe 88 and port 89. The lower end of the shaft 83 is slabbed off to provide blades or extensions 90 which successively cover and then uncover both ports 87 and 89 as the shaft 83 rotates.

As the mixed combustible liquids pass downward through the lower part of the opening 84, they engage a conical spreader 92 axially aligned with the opening 84 but spaced therefrom and supported on separated arms 93. The spreader 92 causes the combustible mixture to be directed outward and thus distributed along the under side of the flat combustion chamber end 81.

Suitable liquids, as gasoline and liquid oxygen, adapted to form a combustible mixture for ignition purposes, may be supplied through pipes 94 and 94ª to an annular passage 95 which communicates with the combustion chamber through perforations 96 in the flange 82. The supply pipes preferably enter the passage 95 at a tangential angle, as shown in Fig. 3a, so that the combustible mixture will be uniformly distributed around the combustion chamber. The mixture in the annular passage 95 may be periodically ignited by a spark-plug 97. Back fire is prevented by light check valves 97ª. An ignition device of this general type is shown in prior Goddard Patent No. 2,090,039, issued August 17, 1937.

In Fig. 4, I have shown a modified and more simple manner of igniting a charge by mounting a spark-plug 98 directly in the flat end wall 99 of the combustion chamber.

In Fig. 5, I have shown a further modification in which the end wall 100 of the combustion chamber 101 is concave upward, instead of being flat as shown in Fig. 3. By varying the curvature, the waves produced by explosions in rapid succession may be focussed at any desired point and may be caused to produce high pitch sound waves of great intensity, available for warning or signal purposes.

The explosive charge in this modification assumes the form of a slightly concave disc 102 which gradually increases in diameter until detonation occurs.

In Fig. 6, I have shown a modified construction in which a conical spreader 105 is mounted on an extension 106 of the valve shaft 107. I have also shown the shaft extension 106 as provided with a perforated disc 108 and with a plurality of angularly disposed vanes 109. As the combustible liquids are fed through pipes 110 and 111 and ports 112 and 113, they are very effectively intermingled in their further passage by the vanes 109 and the perforated disc 108. Furthermore, the spreader 105, being mounted on the shaft extension 106, does not require supporting arms as in the construction shown in Fig. 3.

In combustion chambers of the flat or concave types shown in Figs. 3, 4 and 5, it is desirable that the density of the combustible or explosive charge should be as uniform as possible over the flat or concave surface. Such a result may be attained by use of the valve mechanism shown in Fig. 7, where a valve V in each supply pipe, as 115, is provided with an arm 116 having a pin-and-slot connection to a plunger 117 associated with a solenoid 118. The arm 116 is normally held against a stop pin 119 by a tension spring 120.

When the solenoid 118 is energized, the valve V will be quickly and fully opened and a relatively heavy flow will take place. This flow thereafter gradually decreases as the valve is gradually closed by the spring 120 acting cumulatively against the inertia of the valve V, the arm 16 and the plunger 117 after the solenoid circuit is broken. In this manner the flow of liquids may be controlled so that the explosive charge near the center of the flat or concave end surface and delivered just prior to final closing of the valve is no more dense than at the periphery where the greater area offsets the more rapid feed due to maximum valve opening.

In Figs. 8 to 10, I have shown a modified construction of feeding device in which liquid oxygen is supplied through a pipe 122 and passage 123 to a port 124 in a sleeve 125. Gasoline is similarly supplied through a pipe 127, passage 128 and port 129. The ports 124 and 129 are successively covered and uncovered by rotation of a valve shaft 130 having a solid wedge-shaped end portion 131 (Figs. 8 and 9). This solid end portion has the advantage of separating the liquids as they enter through the ports 124 and 129, so that premixing in the passages 123 and 128 will not occur.

Guide members 133 (Figs. 8 and 10) are provided in the passages 123 and 128, and each guide member is provided with an axial opening 134 and with a plurality of spiral grooves 135. A portion of the liquid fed through each passage 123 or 128 is thus given a rotational movement as it approaches its associated port 124 or 129, which rotational movement facilitates more complete intermingling of the liquids as they enter the cylindrical opening 137 in which the valve shaft 130 rotates. The combustion chamber 138 may be of the conical type shown in Figs. 1 and 2.

In Figs. 11, 12 and 13, I have shown a conical combustion chamber 140 having an inwardly contracted lower extension 141. A spreader 142 is mounted at the lower end of the inlet opening 143 and is supported by arms 144, as previously described with reference to Fig. 3.

The spreader 142 may preferably be of the special construction shown in Figs. 12 and 13 in which the spreader is provided with a plurality of spirally disposed external grooves 146 by which the intermingled liquids are given a rotational movement as they enter the chamber 140, which movement causes them to spread outward in the chamber and to dispose themselves adjacent the conical inner surface thereof. Explosion or detonation may be effected by providing an annular passage 147, a supply pipe 148 for a combustible mixture, perforations 149 through the combustion chamber wall, and a spark-plug 150, all as previously described and as shown in said prior Goddard Patent No. 2,090,039.

This type of combustion chamber is of advantage where expansion of the gases takes place relatively slowly and requires an appreciable time.

In Figs. 14 to 17, I have shown feeding and control mechanism by which gasoline, liquid oxygen and a neutral liquid such as water may be supplied to a combustion chamber, the water being fed alternately to the gasoline and oxygen.

Supply pipes 155, 156 and 157 are each connected into a recess or chamber 158 in the hub or upward extension 159 of a conical combustion chamber 160. The pipes 155, 156 and 157 are provided with segmental conical end plates 160ᵃ (Fig. 16) in which ports 161, 162 and 163 are formed. A valve member 166 in the form of an inverted hollow cone is mounted on a shaft or valve stem 167 rotatable in a fixed upper bearing 168 and a fixed lower bearing 169, which latter bearing is supported in the recess 158 by spaced arms 170. The conical valve member 166 is concentric with the segmental conical end plates 160ᵃ.

The ports 161, 162 and 163 are at different elevations, and the valve member 166 is provided with corresponding ports 171, 172 and 173. Each pair of ports 171 and 172 (Fig. 18) are in line along a generator of the cone 166, whereas the ports 173 are spaced midway between the generators of said adjacent pairs. As the valve member 166 is rotated, the ports 171 and 172 will simultaneously register with the fixed ports 161 and 162 and will admit gasoline and liquid oxygen through the hollow cone 166 to the recess 158 and thence to the combustion chamber 160. At this time the ports 163 will be closed.

As the fixed ports 161 and 162 are thereafter closed by rotation of the cone 166, one of the fixed ports 163 will be opened, thus admitting a small portion of water or other neutral liquid which will be vaporized quickly enough so that each successive charge or slug of combustible mixture is separated from the next succeeding slug by a short but appreciable thickness of vapor. This prevents the firing of one charge, as it enters the chamber, by any flame remaining from the charge which has preceded it.

If the ports 171, 172 and 173 are formed as shown in Fig. 17, the reaction of the entering liquids will automatically effect rotation of the valve member 166. In the alternative, any suitable or convenient rotating means may be attached to the upper end of the valve stem 167.

In Fig. 14, I have shown check valves 175 and 176 which are normally open toward the combustion chamber 160. The check valves are slidably mounted in bearings 177 and 178 and are adapted to be raised by an increase in pressure in the combustion chamber, thus closing the lower end of the recess 158 and preventing destructive pressure from reaching the valve member 166.

In Figs. 19 to 22, I have shown a further modification adapted to feed solid fuel, such as powdered coal, together with liquid oxygen and an additional inert liquid or gas, such as nitrogen.

I have shown a portion of a conical combustion chamber 180 having an upward extension 181 with a cylindrical recess or opening 182 in which a plunger 183 is vertically reciprocated. A feed chamber 184 is connected through a passage 185 to a port 186 opening into the cylindrical recess 182.

The plunger 183 may have a rod-like extension 183ᵃ which will provide an axial opening in the cylindrical explosive charge or at least an axial portion of reduced density. More uniform production of gases may be attained, particularly when solid fuel is used.

Liquid oxygen is fed to the feed chamber 184 through a pipe 188, and the flow of oxygen is controlled by a valve 189 connected to a valve-operating rod 190. Liquid or gaseous nitrogen or some similar inert substance is supplied through a pipe 192 and the feed is controlled by a valve 193 operated by a valve rod 194. The cross sections of the valves 189 and 193 may be as shown in Fig. 20, and the valves are so related that the valve 189 will be closed when the valve 193 is open and vice-versa.

The feed chamber 184 has also an inclined cylindrical extension 200 (Fig. 19), in which a feed cylinder 201 is rotatably mounted in bearings 202 and 203. The cylinder 201 is provided with helical ribs 204 on its outer surface and acts as a feed screw to advance the powdered or other solid fuel from a storage chamber 206 to the feed chamber 184. A feed shaft 210 (Fig. 21) is mounted in fixed bearings 211 and 212 and is connected through bevel gears 213 (Figs. 19 and 21) to the cylinder 201. An open frame 216 is connected to a rod 217 by which the frame 216 is vertically reciprocated. Racks 220 and 221 (Fig. 21) are provided in the frame 216 and engage pinions 222 and 223 respectively. Each pinion is connected to the feed shaft 210 by a one-way clutch 224 which may be of the Horton or roller bearing type shown in Fig. 22.

As the rod 217 and frame 216 are moved upward, the pinion 222 will be rotated clockwise and will rotate the feed shaft 210 in the same direction. As the frame 216 is moved downward, the pinion 223 will be similarly rotated clockwise and will continue the clockwise rotation of the shaft 210. Consequently, the cylinder 201 will be progressively rotated in a feeding direction but the feeding movements will momentarily cease as the frame 216 reaches its upper or lower limit of travel. At this time also the oxygen valve 189 will be closed and the nitrogen valve 193 will be opened.

The powdered coal or other solid fuel will thus be advanced intermittently to the feed chamber 184, where it will be mixed with the liquid oxygen and will be delivered through the passage 185, port 186 and cylindrical recess 182 to the combustion chamber 180. Any suitable ignition device, such as is shown in Figs. 3 or 4, may be provided. The reciprocated rods 190, 194 and 217 may be connected to a single operating member 226 by which they are given simultaneous operative movements.

From the foregoing description, it will be evident that I have devised new and improved devices by which a mixture of combustible and oxidizing materials may be fed intermittently to a combustion chamber which is maintained in fixed position.

I have also shown and described improved means for cooling the walls of such a combustion chamber, either by an additional cooling liquid, as water, or by utilizing the combustion liquids themselves. In the latter case it is desirable that the combustible and oxidizing liquids shall not take up so much heat that the resultant mixture will become gaseous as it enters the combustion chamber.

In all forms of the invention it will be understood that the liquids supplied, whether combustible, oxidizing or inert, are delivered to their respective supply pipes under substantial pressure from storage tanks (not shown) or from other suitable sources of supply. In the case of powdered fuel, as shown in Fig. 19, the powdered fuel itself need not be under pressure, except that due to the effect of gravity in the storage chamber 206.

Having thus described my invention and certain modifications thereof, I do not wish to be limited to the details herein disclosed, otherwise than as set forth in the claims, but what I claim is:

1. In combustion apparatus, a detonating chamber having one closed entrance end and one fully open discharge end and said chamber continuously expanding from its closed entrance end to its open discharge end and being at all times freely open to the atmosphere and having a relatively small axial recessed entrance portion at its closed end, means to feed powdered solid fuel and an oxidizing liquid to said recessed portion, means to periodically interrupt the flow of said solid fuel and said oxidizing liquid to said recessed portion, whereby they enter the chamber as separated charges of mixed combustible material, means to ignite and detonate each separate charge, and means to supply an inert fluid to said recessed portion between each two successive detonating charges and in timed relation thereto.

2. In combustion apparatus, a detonating chamber having one closed end and one fully open end and said chamber being at all times freely open to the atmosphere, means to feed an oxidizing liquid to said chamber, a feed passage for powdered solid fuel connecting to said chamber, a feed cylinder rotatable in said passage and having external helical feeding elements thereon, means to rotate said cylinder and to periodically interrupt such rotation and to simultaneously interrupt the feed of the oxidizing liquid, whereby said materials enter the detonating chamber as separated charges of mixed combustible materials, and means to supply an inert fluid between each two successive detonating charges to prevent flash-back between successive charges.

3. In combustion apparatus, a detonating chamber having one closed entrance end and one fully open discharge end and said chamber continuously expanding from its closed entrance end to its open discharge end and being at all times freely open to the atmosphere and having a relatively small axial recessed entrance portion at its closed end, means to feed powdered solid fuel and an oxidizing liquid to said recessed portion, a reciprocated plunger effective to periodically interrupt the flow of said solid fuel and said oxidizing liquid to said recessed portion, whereby they enter the chamber as separated charges, means to ignite and detonate each separate charge, means to supply an inert fluid between each two successive detonating charges, and said plunger having an axially disposed depending rod extending into said chamber and providing an axial portion of less density in each charge.

ROBERT H. GODDARD.

REFERENCES CITED

The following references are of record in the file of this patent:

UNITED STATES PATENTS

| Number | Name | Date |
| --- | --- | --- |
| 313,689 | Secor | Mar. 10, 1885 |
| 379,674 | Bolmer | Mar. 20, 1888 |
| 861,329 | Stodola | July 30, 1907 |
| 1,008,689 | Blaisdell | Nov. 14, 1911 |
| 1,124,409 | Floyd | Jan. 12, 1915 |
| 1,530,898 | Klein | Mar. 24, 1925 |
| 1,532,930 | O'Neill | Apr. 7, 1925 |
| 1,879,186 | Goddard | Sept. 27, 1932 |
| 2,085,800 | Goddard | July 6, 1937 |
| 2,283,863 | Achterman | May 19, 1942 |

FOREIGN PATENTS

| Number | Country | Date |
| --- | --- | --- |
| 3,561 | Great Britain | Aug. 16, 1881 |
| 152,872 | Great Britain | Oct. 28, 1920 |
| 459,924 | Great Britain | Jan. 18, 1937 |
| 421,786 | France | Jan. 4, 1911 |
| 589,726 | France | Feb. 27, 1925 |
| 157,231 | Switzerland | Dec. 1, 1932 |